H. L. DOHERTY.
METHOD OF TREATING LIQUIDS TO REMOVE DISSOLVED SALTS.
APPLICATION FILED JULY 16, 1912. RENEWED JUNE 7, 1917.

1,251,486.

Patented Jan. 1, 1918.
2 SHEETS—SHEET 2.

UNITED STATES PATENT OFFICE.

HENRY L. DOHERTY, OF NEW YORK, N. Y.

METHOD OF TREATING LIQUIDS TO REMOVE DISSOLVED SALTS.

1,251,486.  Specification of Letters Patent.  Patented Jan. 1, 1918.

Application filed July 16, 1912, Serial No. 709,795. Renewed June 7, 1917. Serial No. 173,420.

*To all whom it may concern:*

Be it known that I, HENRY L. DOHERTY, a citizen of the United States, and a resident of New York city, in the county of New York and State of New York, have invented certain new and useful Improvements in Methods of Treating Liquids to Remove Dissolved Salts, of which the following is a specification.

My invention relates to methods of treating liquids to remove dissolved salts, and in particular to a method of removing from solution in a liquid dissolved salts whose solubility diminishes with an increase in the temperature of the solution. The object of my invention is the improvement of the operation, mentioned, to the end that the separation of such salts is facilitated and the heating operation carried out with the smallest practicable expenditure of heat.

As applied to the purification of natural waters by the removal of dissolved carbonates, sulfates, etc., my invention briefly stated, comprises the heating of the water in a plurality of steps by a current of heated gaseous medium passed in counter-current relationship with the water, whereby the water is heated and the gaseous medium cooled, the exposure of the water after each heating step to a relatively large contact surface to facilitate crystallization of dissolved compounds, and the cooling of the purified water by bringing the same into counter-current, heat-transferring relationship with the gaseous heat-carrying medium which has been cooled by the untreated water flowing to the purifying apparatus, as well as other minor features which are set forth in detail below.

In the drawings, I have shown one apparatus embodiment of my invention adapted for carrying out my process.

It is to be understood that the drawings are more or less diagrammatic in character, only such details of the apparatus as are necessary to illustrate the following description being shown. It is also to be understood that while I describe below the specific application of my invention to the purification of water I do not limit myself to such use of it, as it may be applied, generally, to the removal from liquids of dissolved salts whose crystallization is facilitated by heating. It is particularly advantageous in the purification of the brine solutions used in the salt industry.

Figure 1:
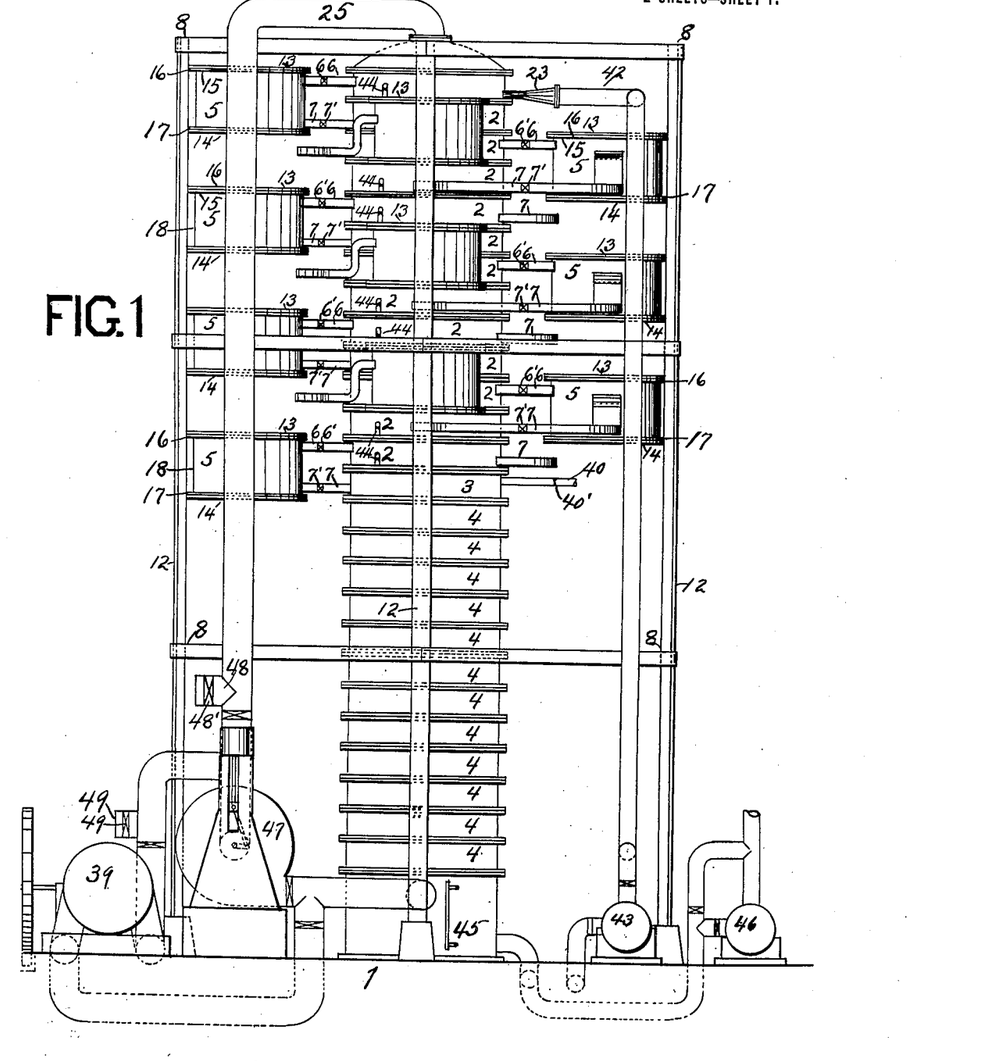
Figure 1 is a more or less diagrammatic elevation of my apparatus.
Figure 2:
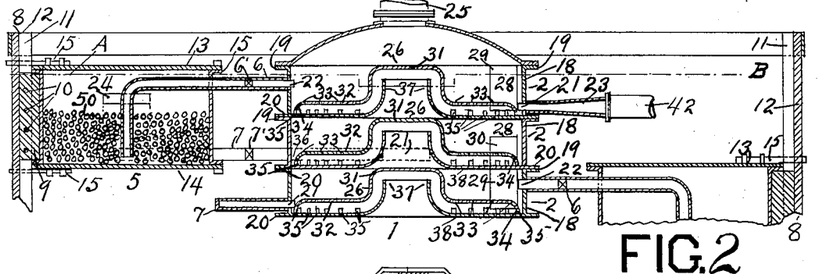
Fig. 2 is a vertical partial section through the same on the line C—D of Fig. 3.
Figure 3:
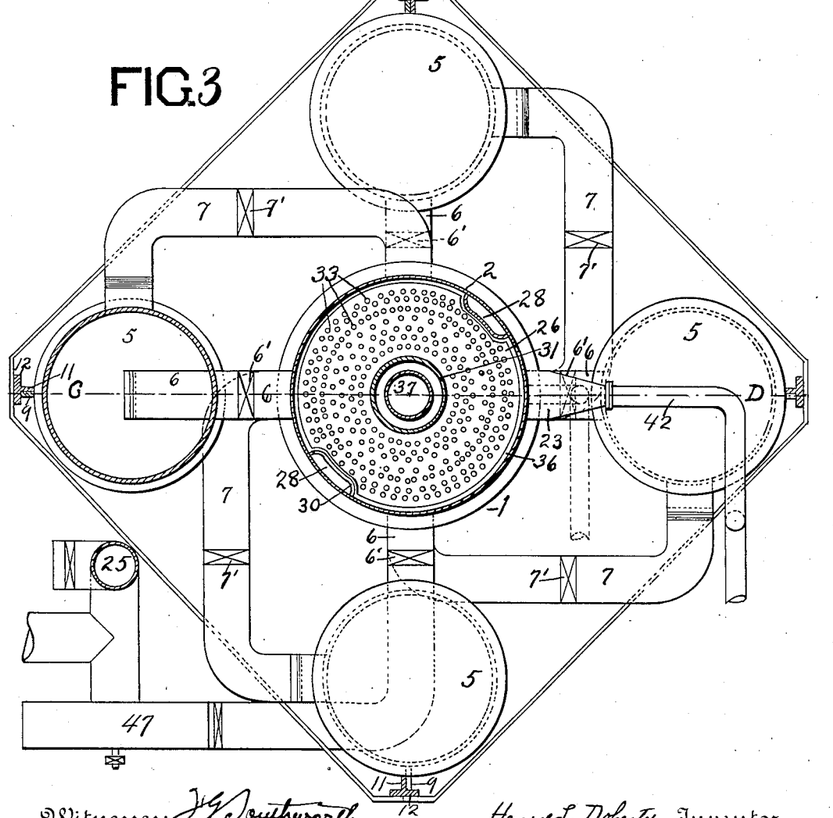
Fig. 3 is a horizontal cross-section of the apparatus on the line A—B of Fig. 2.

1 represents the heat interchanger of the apparatus, as a whole, in which heat of the purified water is transferred to the untreated water and the latter is heated to the maximum required temperature. 2, 2, 2, etc., are the individual contact chambers of the "heater" portion of the heat-interchanger 1, 3 is the section of 1 into which the extraneous heat required in the operation is introduced—preferably in the form of steam. 4, 4, 4, etc., are the individual chambers of the "cooler" portion of heat-interchanger 1 in which the purified water or other liquid is subjected to gradual cooling by the current of gaseous heat-carrying medium which has been previously cooled by counter-current contact with the inflowing untreated liquid. 5, 5, etc., are the crystallizing chambers in which the heated liquid is exposed to contact with a large area of crystallizing surface. This contact area is advantageously secured by filling the chambers 5 with pebbles, or any other suitable substance. It may, however, be secured in any preferred way. The members designated by the numerals 6 are the overflow connections from the contact chambers 2 to the crystallizing chambers 5. The members designated by the numerals 7 are the corresponding return passages for liquid to the contact chambers 2, carrying the overflow from chambers 5 back to the chamber 2 located just below the chamber 2 to which the corresponding member is connected. 6' and 7' are the valves on the corresponding connections 6 and 7. 8 is the supporting frame-work for the crystallizing chambers 5. As shown, each of the chambers 5 has a vertical web 9 which is bolted by bolts 10 to the web 11 of the T beam or angle-iron 12. The chambers have a removable, hermetically-sealing cover 13 and a removable, hermetically-sealing bottom 14. As shown, both the covers 13 and bottoms 14 are arranged to be opened by lateral rotation. They have suitable clamping devices 15 which hold them tightly against the corresponding ground flanges 16 and 17 of the crystallizers 5. These crystallizers are arranged around the heat-interchanger 1 in spiral formation so that ample room is left between adjoining crystallizers for the manipulation of the covers and bottoms 13 and 14 respectively.

The heat-interchanger 1 is made up of a number of superimposed contact chambers designated by the numerals 2, 3 and 4. These are preferably alike in construction, save as to the connections to the crystallizers 5. The contact chambers 2 each comprise a cylindrical wall 18 having an upper horizontal flange 19 and a lower horizontal flange 20 on their exterior surface. Ports 21 and 22 in the cylindrical wall 18 of each contact chamber establish communication with, respectively, the inlet passage to and the outlet passage from that chamber. As shown, the ports 21 are located near the bottom of the respective chambers, while the ports 22 are located diametrically opposite to, and above, the ports 21, at the normal overflow level from the chamber. The inlet port 21 of the uppermost of chambers 2 establishes communication between the inlet connection 23 and the interior of this chamber. In the case of the remainder of chambers 2, the port 21 of each chamber establishes communication with the member 6, which serves as the overflow passage from the crystallizer 5 coöperating with that chamber. Ports 22 of the contact chambers 2, communicate with the overflow, or outlet passages 6, of the respective chambers 2, which passages lead to the lower part of the crystallizers 5, coöperating with the respective chambers. The liquid discharging from a given contact chamber 2 of the "heater" portion of heat-interchanger 1, thus passes to the bottom of the crystallizer 5, coöperating with that chamber, rises through 5, overflows through the port 24, and thence flows back to 1, through the connection 7 of that crystallizer, to the port 21 of the chamber 2 next below the chamber from which it had flowed to the particular crystallizer considered.

In addition to the overflow passages 6, the contact chambers 2 are provided with auxiliary overflow passages 28, establishing direct communication between adjacent contact chambers. These auxiliary overflow passages are made up of two registering flattened tubes, numbered 29 and 30 respectively, arranged in proximity to the walls of adjacent chambers. The tubes 29 are formed with their upper terminations flush with the upper surface of the respective flanges 19 of the contact chambers, and their lower terminations extending below the members 26 of the respective chambers. The tubes 30 are preferably located diametrically opposite to the tubes 29, and have their upper ends terminating at a level a short distance below the level of the upper edges of the tubulatures 37, and above the level of the normal overflow passages 6, while their lower ends are flush with the faces of the lower flanges 20. In assembling the contact chambers, the tube 30 of the upper of two adjacent chambers is made to register with the tube 29 of the lower chamber. There is thus formed an auxiliary overflow passage from each contact chamber to the one below it, that is sealed by nearly the full depth of liquid in the chamber below. By closing valves 6' and 7' on the normal circulation passages 6 and 7 between any two adjacent contact chambers, therefore, the liquid in the upper contact chamber rises to the level of the upper extremity of the tube 30 of that chamber and then overflows through the auxiliary passage 28, formed by the registering tubes 30 and 29 of the upper and lower contact chambers, and discharges into the lower of the two chambers below the member 26 of that chamber. In the lower contact chambers, 3 and 4, these passages 28, formed by registering tubes 30 and 29 of adjacent chambers, constitute the normal overflow passages—the connections 6 and 7 being omitted on these chambers 3 and 4.

The members 26 have an axial hood portion, 31, a horizontal flange, 32, having numerous perforations, 33, and a downwardly-turned peripheral lip, 34, which supports the perforated flange 32 above the bottom of the contact chamber—but considerably above the lower extremities of the tubes 29 of that chamber. The lower edge of the vertical lip 34 has openings 35. As shown, the flange 34 of member 26 does not contact with the inner periphery of the cylindrical wall 18 of the chamber 2 but leaves an annular space, 26. The ports 21 are thus comparatively unobstructed. The liquid entering the chambers 2 from the corresponding connections 7 flows into these annular spaces and mingles with the small bodies of liquid in the contact chambers. This liquid is kept in violent agitation and circulation by the gaseous current passing upward through the chambers. Openings 35 in the lips 34 of the members 26 in connection with the annular space 36 permit of free circulation of the liquid and avoid any trapping of relatively stagnant liquid under the members 26. The heated current of air, or whatever gaseous medium is employed, in bubbling through the liquid in the chambers 2 gives up to the liquid a certain amount of heat in each chamber. The liquid discharging from any chamber to the coöperating crystallizer, or directly to the chamber below, as the case may be, is thus always at a higher temperature than the liquid entering that chamber. The rise in temperature of the liquid in each chamber depends principally upon the difference between the initial temperature of the liquid flowing to 1 and the temperature of the gaseous medium leaving 3, the number of the contact chambers and the rates of flow of the liquid and gaseous medium.

The gaseous medium employed, enters the sump chamber 45 and passes upward from chamber to chamber through the tubulatures 37 in the bottoms 38 of the chambers 4, 3 and 2. These tubulatures 37 have their upper extremities above the level of the upper orifice of the tubes 30. There is thus no tendency for liquid to find its way through the tubulatures 37 from one contact chamber to the one below it.

The apparatus having been properly assembled, the method of operation, when applying my invention to the purification of a natural water containing appreciable quantities of one or more or of all of the following impurities, viz., carbonates or sulfates of lime, magnesia or any other salts which may be caused to assume an insoluble form on heating, such as various compounds of silica, iron, etc., is as follows:—

The compressor 39 is started and steam is turned into chamber 3 from pipe 40 by opening valve 40'. The water to be heated enters the uppermost of contact chambers 2, through the pipe 42. (If the supply is not under sufficient pressure to raise it to the uppermost chamber it may be forced to that level by means of a pump 43.) In the contact chamber 2, the water is subjected to the action of the ascending air which has been heated by the steam injected in 3, but has lost most of the steam through condensation by the initially cold walls of the contact chambers 2. The air enters the uppermost chamber through its gas passage 37, spreads out under the flange 32 of the member 36 and passing up through the perforations 33 bubbles through the water in this chamber, yielding up to the water part of the residual heat that it carries above the temperature of the water. The oxygen of the air may also have a chemical effect on the impurities of the water when the latter carries any oxidizable substances. For example, soluble iron carbonates are oxidized by air to insoluble carbonates of higher oxidization. Other ferrous compounds may be broken up and the iron caused to separate as insoluble ferric hydrate. Depending upon the temperature imparted to the water, there may also be some separation of carbonates of the alkaline earth metals.

When the water has reached the level of the normal overflow passage 6, if it is found that any precipitation has taken place (which may be determined by drawing off a sample of the water through the pet cock 44 of that chamber) the valves 6' and 7' on the uppermost of connections 6 and 7 are opened. The water now overflows through the passage 6, of the contact chamber considered, and passes through 6 to the bottom of the uppermost crystallizer 5. Ascending through this crystallizer any separated matter in the water deposits on the pebble filling of the crystallizer and the clarified water returns to the next contact chamber 2 of the interchanger 1 through the pipe 7 of that chamber. The water flows through the port 21 into the lower part of the contact chamber. Here it is subjected to the action of still warmer air and is further heated. If any precipitation is occasioned, the valve 6' on the connection 6 to this second section and the valve 7' on the connection 7 to the third section are opened and the water passed through the second of crystallizers 5.

In the same way, the water passes through the remainder of the contact chambers 2 and, if necessary, their coöperating crystallizers 5, and is raised to the maximum temperature desired in the lowest of the chambers 2 where it is brought into contact with the gaseous medium which has been heated to its maximum temperature in 3. In this way the water is subjected to gradual heating in a plurality of stages, from its initial temperature up to the maximum temperature required. As a rule, this is about 300 to 312° F., and about 70 lb. gage pressure, at which temperature calcium sulfate becomes insoluble and precipitates. The soluble carbonate salts of the alkaline earth metals start to decompose at temperatures below 212° so that their removal is incidentally effected in the operation of removing the sulfate of lime, and requires no special adjustment of the apparatus. When sulfates are absent, the removal of the carbonates down to the practical minimum may be effected by simple heating to boiling under atmospheric pressure. The relation between the number of the contact chambers 2, the rate of flow of the water and the rate of circulation of the gaseous medium must be such that the water will have been exposed to the desired temperature for a sufficient length of time, by the time that it has reached the lowest of chambers 2, to effect the separation of the last portions of the precipitable impurities that it is practicable to remove.

By means of the cocks 44, samples may be taken of the water after each heating step, and, if it is found that no precipitation is occasioned by that step, the valve 6' on the connection 6 of the corresponding contact chamber is closed. In this case the water passes directly from this chamber to the one next below through the auxiliary overflow passage 28 of the chamber considered.

If the working has been properly regulated, the water passes from the lowest of the chambers 2 containing, only, the practically irreducible minimum of the removable impurities. This purified water passing to the chamber 3, and thence successively through the contact chambers 4 of the "cooler" section of the heat-interchanger 1, is subjected to gradual cooling in a plurality of steps by the ascending current of the initially cool gaseous medium used. In passing through the sections 4, the water passes directly from one chamber to the one next below through the overflow passages 28 of these chambers. In the lowest of the chambers 4, the water receives its final cooling by being contacted with the cool gaseous medium forced into the sump chamber 45, from compressor 39. The purified and cooled water discharges from the lowest of chambers 4, into the sump chamber 45. From 45 the water is either drawn or pumped to the place of use by pumps 46 according to whether the treatment was or was not carried out under pressure. The gaseous heat-carrying medium ascends through the chambers 4, 3 and 2, being first gradually heated in chambers 4 to its maximum temperature, which it reaches in 3, and then gradually cooled in chambers 2. If the volume of the gaseous medium flowing has been properly adjusted with respect to the volume of the liquid the gaseous medium will discharge through the pipe 25, connected with the uppermost contact chamber 2, at approximately the temperature at which the liquid enters that chamber. Usually, the gaseous medium used is returned to the circulating blower 47 through the pipe 25 to be again circulated through the apparatus, the proper volume in circulation being maintained by forcing any deficiency in the medium into the system by means of the compressor 39. Even when air is the medium used it is usually thus circulated in closed circuit in order to avoid the necessity of compressing it to the pressure prevailing in 1, each time that it is circulated. Even when the system is not operated under pressure, there may be an advantage in thus maintaining the air in closed circulation, when the water or other liquid treated has an initial temperature below that of the atmospheric air. When this is not the case, when operating 1 at atmospheric pressure, the air that has passed through 1 is generally permitted to escape through the bleeder 48, controlled by valve 48' on pipe 25, and fresh air drawn in by the blower through the atmospheric connection 49, having a valve 49' on its suction line.

When no advantage is to be derived by using an oxidizing draft current for the gaseous circulation, the compressor 39 need only be used to compress the volume of air that is initially required and to make up the loss of the circulating gaseous medium by solution in the cold purified water, since the circulation of the gaseous medium after it has once been put under the proper pressure may be effected by the rotary blower 47 arranged to work as a booster. By this arrangement the power required for operation of the compressor, even when operating the purifier under a pressure of 70 lb. gage is practically *nil*. When operating thus on a closed circuit for gaseous medium, when the start is made with air, there is usually a gradual impoverishment of the air by loss of oxygen to the oxidizable impurities of the water until the circulating medium is principally nitrogen. It is, of course, obvious that any gaseous medium desired may be substituted for air.

By separating the heating and the crystallizing chambers, and making the capacity of the latter relatively greater than that of the former, I am able to almost entirely avoid the deposition of scale in the heating chambers themselves. This is due to three reasons. In the first place, all of the reactions here involved, viz., the precipitation of carbonates, sulfates, etc., from water solution, involve a relatively considerable time element. That is to say, even when conditions which favor, and will ultimately occasion the separation of the impurities considered, have been established, precipitation does not occur at once but takes an appreciable time to manifest itself. Even when it has once started, a still greater length of time is required for the completion of the precipitation. In the second place, in the absence of any preformed crystals upon which the precipitatable salts may form, the rate of crystallization is very slow and the initial crystallization much retarded. The walls of chambers 2 being clean at the start no crystals are present to institute crystallization of salts from the water. In the third place, the water in the contact chambers is subjected to violent agitation and the opportunity for any crystals that may possibly have separated in the contact chambers to deposit is reduced to a minimum.

By my invention, the water is quickly heated through a limited rise in temperature in clean, metallic-walled chambers. It is then withdrawn and disseminated as a film over surfaces composed, preferably, of the same material which the heating stage under consideration is designed to precipitate. Under these conditions, the crystallization which would normally be occasioned by the heating, takes place immediately. By the time the water has flowed through the crystallizer, practically all material whose separation could be occasioned by the previous heating, has deposited. The water now passes to another contact chamber to be quickly heated another stage, flows to another crystallizer, and so on, until all salts which are practically precipitatable have been removed.

At suitable intervals, whose length may be readily determined by the experience of the operator, each crystallizer 5, in use, is cut out of the circulation by closing the valves 6' and 7' on the connections 6 and 7 of that crystallizer, the members 15 released and the bottom 14 opened. The charge 50 of pebbles, or any material used, drops out. The bottom 14 is then shut, the cover 13 opened, another charge of material poured in the crystallizer, the cover shut, and the valves 6' and 7' of the corresponding connections 6 and 7 opened, when the crystallizer is again in service. During the period the crystallizer has been cut out, the water from the contact chamber with which it has been coöperating, of course, flows through the passage 28 of that chamber to the chamber below. The crystallizer of the chamber below, momentarily taking care of the crystallizing operation for the two contact chambers.

When quartz pebbles are used as the filling for the crystallizers, it is advantageous to give them a preliminary coating of crystals of the same kind, or at any rate, which are isomeric with the crystals which they are designed to separate from the water treated. This may be accomplished, by simply wetting the pebbles with the proper chemical solutions to form the salts required and then drying them.

It is obvious that, while I have described my invention as applied to the purification of water specifically, it is excellently adapted for and may be advantageously applied for carrying out the separation of precipitatable substances from solutions of suitable salts by the combined action of heat and a chemically active gas. In this case, the filling of the crystallizers may consist of preformed crystals of the same kind as it is desired to separate.

In carrying out my invention, the relative volumes of liquid and gaseous medium passed through the heat - interchanger should be such as will have substantially equal heat-carrying capacities per degree. When this precaution is observed, owing to the intimacy of contact and the comparatively large number of contacts between liquid and gas, the gas will leave the uppermost contact chamber 2 at, or near, the temperature of the liquid entering the chamber, and the liquid will leave the last of the contact chambers 4 at, or near, the same temperature.

In order to reduce heat losses from the apparatus to a minimum, all exposed, heated surfaces should preferably be jacketed with some good non-conductor of heat, as shown.

Having described my invention, what I claim is:

1. The process of treating liquids containing substances in solution, which comprises, subjecting said liquids to a plurality of heating steps at successively increasing temperature, and after each of said heating steps, contacting the said liquids at substantially the temperature communicated to the same during the preceding heating step and before crystallization of the impurities separable at the temperature communicated to said liquid during said heating step with surfaces comprising materials promoting crystallization of dissolved substances.

2. The process of treating a liquid containing dissolved material, which comprises, subjecting said liquid to comparatively quick heating by contacting said liquid with a gaseous medium which has been heated by contact with a previously treated portion of said liquid, withdrawing said liquid from the heating medium before the separation of any considerable amount of said dissolved material and contacting the heated liquid withdrawn with surfaces promoting crystallization of said dissolved material.

3. The process of treating a liquid containing dissolved material, which comprises, subjecting said liquid to comparatively quick heating by contacting said liquid with a gaseous medium which has been heated by contact with a previously treated portion of said liquid, withdrawing said liquid from contact with the heating medium, before the separation of any considerable amount of said dissolved material, and contacting the heated liquid withdrawn with surfaces promoting crystallization of said dissolved material for a sufficient length of time to effect the crystallization of substantially all of the material which is capable of crystallizing as the result of said heating operation.

4. The process of heating a liquid containing dissolved material, which comprises, subjecting said liquid to comparatively quick heating by contact with a suitable heating medium, said medium having been heated in part by heat recovered from a previously treated portion of said liquid, withdrawing the heated liquid from contact with said heating medium before the separation of any considerable amount of said dissolved material, and causing the heated liquid withdrawn to flow over surfaces comprising substances promoting crystallization of said dissolved material, the area of said surfaces and the rate of flow of the heated liquid over them being so regulated as to permit the crystallization of substantially all of the material which is capable of crystallizing as a result of said heating operation.

5. The process of treating a liquid containing dissolved material, which comprises, subjecting said liquid to comparatively quick heating by contact with a suitable heating medium, said medium having been heated in part by heat recovered from a previously treated portion of said liquid, withdrawing the heated liquid from contact with said heating medium before the separation of any considerable amount of said dissolved material, and causing the heated liquid withdrawn to pass as a relatively thin film in contact with surfaces comprising substances promoting the separation of said material, the rate of passage of said liquid over said surfaces being such as will permit of the separation of substantially all of the said material which is capable of crystallizing as a result of said heating operation.

6. The process of treating a liquid containing dissolved material, which comprises, subjecting said liquid to a plurality of heating steps at successively increasing temperatures and after each of said heating steps, contacting the said liquid at substantially the temperature communicated to the same during the preceding heating step, with surfaces promoting crystallization of dissolved material, the time of contact of said liquid with said surfaces after each heating operation being such as will permit of the separation of substantially all of the material which is capable of separation as a result of said heating operation.

7. The process of treating a liquid containing dissolved material which comprises, subjecting said liquid to a plurality of heating steps at graduated temperatures, the duration of each of said heating steps and the rise in temperature imparted to the liquid in each of said heating steps being such as will not occasion the immediate separation of the dissolved substances, and contacting the heated liquid after each of said heating steps with surfaces having a tendency to promote crystallization of dissolved material.

8. The process of treating liquids containing substances in solution, which comprises, subjecting said liquids to a plurality of heating steps at graduated temperatures, after each of said heating steps contacting the said liquids with surfaces comprising materials promoting crystallization of dissolved substances, after such heating subjecting the heated liquid to cooling, and restoring to a fresh portion of said liquids heat withdrawn from the treated portions of said liquids during the said cooling step.

9. The process of treating a liquid containing dissolved material, which comprises, subjecting said liquid to comparatively rapid heating to a temperature and for a period of time so correlated that while the said temperature will ultimately insure the separation and crystallization of dissolved material the period of said heating will be insufficient to permit said crystallization during said heating operation, withdrawing said liquid from contact with the heating medium before the separation of any considerable amount of said dissolved material, contacting the heated liquid withdrawn with surfaces promoting crystallization of said dissolved material, bringing the so-treated liquid into heat-transferring relationship with a fluid heat-carrier to cool the said liquid and to heat said heat-carrier, and establishing heat-transferring relationship between the said heat-carrier and the said liquid during the said heating of the same.

10. The process of treating a liquid containing dissolved material, which comprises, subjecting said liquid to comparatively rapid heating to a temperature and for a period of time so correlated that while the said temperature will ultimately insure the separation and crystallization of dissolved material the period of said heating will be insufficient to permit said crystallization during said heating operation, withdrawing said liquid from said heating operation before the separation of any considerable amount of said dissolved material, contacting the heated liquid withdrawn with surfaces promoting crystallization of said dissolved material for a sufficient length of time to effect the crystallization of substantially all of the material which is capable of crystallizing as the result of said heating operation, subjecting the heated liquid to cooling after the said liquid has been subjected to contact with said crystallizing surfaces, restoring to a fresh portion of the liquid to be treated heat withdrawn from the treated portion of said liquid during the said cooling operation, through the medium of a fluid heat-carrier which is brought into heat-transferring relationship, in turn, with the treated and the untreated liquid.

11. The process of treating a liquid containing dissolved material, which comprises, subjecting said liquid to comparatively rapid heating by contact with a suitable fluid heat-carrier, to a temperature and for a period of time so correlated that while the said temperature will ultimately insure the separation and crystallization of dissolved material the period of said heating will be insufficient to permit said crystallization during said heating operation, withdrawing the heated liquid from contact with said fluid heat-carrier before the separation of any considerable amount of said dissolved material, causing the heated liquid withdrawn to flow over surfaces comprising substances promoting crystallization of said dissolved material, the area of said surfaces and the rate of flow of the heated liquid over them being so regulated as to permit of the crystallization of substantially all of the material which is capable of crystallizing as a result of said heating operation, subjecting the heated liquid to cooling after the said liquid has been contacted with said crystallizing surfaces, by bringing the said liquid into heat-transferring relationship with the said fluid heat-carrier, to heat the same prior to contacting the said fluid heat-carrier with the said liquid containing dissolved material.

12. The process of treating a liquid containing dissolved material, which comprises, subjecting said liquid to comparatively rapid heating by contacting the same with a suitable fluid heat-carrier, to a temperature and for a period of time so correlated that while the said temperature will ultimately insure the separation and crystallization of dissolved material the period of said heating will be insufficient to permit said crystallization during said heating operation, withdrawing the heated liquid from contact with said fluid heat-carrier before the crystallization of said dissolved material, dispersing the heated liquid as a relatively thin film over surfaces comprising substances promoting the separation of said material, the rate of passage of said liquid over said surfaces being such as will permit of the separation of substantially all of the said material which is capable of crystallizing as a result of said heating operation, subjecting the said liquid to cooling, after the separation of said material therefrom, by contacting the said liquid with the said fluid heat-carrier after the said heat-carrier has been contacted with the said liquid containing dissolved material, and maintaining the circulation of said fluid heat-carrier between further portions of the treated and untreated liquid.

13. The process of treating a liquid containing dissolved material, which comprises, subjecting said liquid to a plurality of heating steps at gradually increasing temperatures, after each of said heating steps contacting the said liquid with surfaces promoting crystallization of dissolved material, the time of contact of said liquid with said surfaces after each of said heating steps being such as will permit of the separation of substantially all of the material which is capable of separating as a result of said heating operation, subjecting the liquid after its last contact with said crystallizing surfaces to cooling to reduce the said liquid to substantially its original temperature, and restoring to a fresh portion of the liquid to be treated heat withdrawn from the treated portion of said liquid during the cooling operation.

14. The process of treating a liquid containing dissolved material, which comprises, subjecting said liquid to a plurality of heating steps at successively increasing temperatures, each of the said heating steps being carried out at a temperature and for a period of time so correlated that while the said temperature will ultimately occasion the separation and crystallization of dissolved material the period of said heating will be insufficient to permit said crystallization during said heating operation, contacting the heated liquid after each of said heating steps with surfaces having a tendency to promote crystallization of dissolved material, and subjecting the liquid after its contact with the last of said crystallizing surfaces to cooling to reduce the said liquid to approximately its original temperature.

15. The process of treating a liquid containing dissolved material, which comprises, maintaining a closed circulation of a gaseous heat-carrying medium, introducing heat into said medium at some locality in its circuit, bringing the liquid to be treated in contact with the said medium after the introduction of heat into the same, whereby the said liquid is heated and said medium is cooled, withdrawing the heated liquid from contact with said medium, contacting the said heated liquid with surfaces promoting the crystallization of said material, whereby material is separated from said liquid, and bringing the so-treated liquid into counter-current heat-transferring relationship with the cooled gaseous heat-carrying medium, whereby said liquid is cooled and the said medium is reheated.

16. The process of treating liquids to cause the separation of dissolved materials, which comprises, maintaining a closed circulation of a gaseous medium, introducing heat into said medium at some locality in its circuit, subjecting the liquid to be treated to successive contacts with the said medium after the introduction of heat into the same, whereby the said liquid is subjected to a plurality of heating steps and the said medium is cooled, and after each of said heating steps contacting the said liquid with surfaces comprising substances promoting crystallization of said material, whereby materials are separated from said liquid in the successive crystallizing steps according to the temperature at which they respectively become insoluble, and bringing the heated liquid after its contact with the last of said crystallizing surfaces into counter-current heat-transferring relationship with the cooled gaseous medium, whereby the said liquid is cooled and the said medium is reheated.

17. The process of treating liquids to cause the separation of dissolved material, which comprises, maintaining a closed circulation of a gaseous heat-carrying medium, introducing heat into said medium at some locality in its circuit, subjecting the liquid to be treated to a plurality of contacts in counter-current relationship with said medium, after the same has been heated, whereby the said liquid is heated and the said medium is cooled, after one or more of said heating steps, contacting the heated liquid with crystallizing surfaces, the duration of said contacts with said surfaces being such as will permit of the separation of substantially all of the material which has been rendered separable by the prior heating of said liquid, subjecting the heated liquid after its contact with the last of said crystallizing surfaces to a plurality of contacts in counter-current relationship with the cooled gaseous medium, whereby the said liquid is cooled and the said medium is reheated.

18. The process of treating liquids to cause the separation of dissolved material, which comprises, maintaining a closed circulation of a gaseous heat-carrying medium, introducing steam into the previously heated medium at some locality in its circuit, subjecting the liquid to be treated to counter-current contact with the heated medium after the introduction of steam into the same, whereby the said liquid is heated and the said medium is cooled, contacting the heated liquid with surfaces capable of promoting the separation of said material from the heated liquid, whereby material is separated from said liquid, and subjecting the heated liquid to a plurality of contacts in counter-current relationship with the cooled medium whereby the said treated liquid is cooled and the said medium is reheated.

19. The process of treating liquids to cause separation of dissolved material which comprises, maintaining a closed circulation of a gaseous heat-carrying medium, introducing steam into said medium, subjecting the liquid to be treated to a plurality of counter-current contacts with the said medium after the introduction of steam into the same, whereby a plurality of temperature increments are communicated to said liquid, withdrawing the said liquid from contact with said medium after it has received the proper temperature increment to permit of the separation of a portion of said dissolved material, contacting the withdrawn liquid with surfaces capable of promoting the separation of said material, returning the liquid to said heating operation to receive further temperature increments sufficient to permit of the separation of another portion of said material, again contacting the liquid with surfaces capable of promoting the separation of said material, restoring said liquid to said heating operation to receive further temperature increments, and so continuing to alternately impart temperature increments to said liquid and to separate material therefrom until the material remaining in solution in said liquid has been reduced to the practical minimum.

20. The process of treating liquids to cause separation of dissolved material, which comprises, maintaining a closed circulation of a gaseous heat-carrying medium, introducing steam into the previously heated medium, subjecting the liquid to be treated to a plurality of counter-current contacts with the said medium after the introduction of steam into the same, whereby a plurality of successive temperature increments are communicated to said liquid and the said medium cooled, withdrawing the said liquid from contact with said medium after it has received the proper temperature increment to permit of the separation of a substantial portion of said dissolved material, contacting the liquid withdrawn with surfaces capable of promoting the separation of said material, returning the liquid to said heating operation to receive further temperature increments sufficient to permit of the separation of another portion of said material, again contacting said liquid with surfaces capable of promoting the separation of said material, again restoring said liquid to said heating operation to receive further temperature increments, and so continuing to alternately impart temperature increments to said liquid and to separate material therefrom until the material remaining in solution in said liquid has been reduced to the practical minimum under the conditions of treatment, and subjecting the hot treated liquid to a plurality of counter-current contacts with the cooled gaseous medium, whereby the said liquid is cooled and the said gaseous medium is heated.

21. The process of treating liquids to cause separation of dissolved material, which comprises, establishing contact in counter-current relationship between liquid to be treated and a gaseous medium, applying heat to the said contacted liquid and gaseous streams at a mid-point in their path of contact, whereby a locality of maximum temperature is established in said liquid and gaseous streams and the said streams are subjected to an increasing temperature gradient while flowing toward said locality of maximum temperature, and to a diminishing temperature gradient while flowing away from said locality, withdrawing said liquid from contact with said gaseous medium at selected intervals in its increasing temperature gradient and contacting the said liquid after each withdrawal with surfaces capable of promoting the separation of said material, and restoring the said liquid to contact with said gaseous medium after each of its said contacts with said surfaces, whereby the separation of said material due to the heating of said liquid is caused to take place upon said surfaces instead of in the vessel in which said heating is applied.

22. The process of treating liquids to cause separation of dissolved material, which comprises, establishing contact in counter-current relationship between a stream of liquid to be treated and a stream of gaseous medium, applying heat to the contacted streams at a mid-point in their path of contact, whereby a locality of maximum temperature is established in said liquid and gaseous streams and the said streams are subjected to an increasing temperature gradient while flowing toward said locality of maximum temperature and to a diminishing temperature gradient while flowing away from said locality, withdrawing said liquid from contact with said gaseous medium at selected intervals in its increasing temperature gradient and contacting the said liquid after each withdrawal with surfaces capable of promoting the separation of said material, the period between the said withdrawals of said liquid being regulated to that required for the said liquid to receive sufficient heat to permit of the separation of an appreciable proportion of its dissolved material, and restoring the said liquid to contact with said gaseous medium after each of its said contacts with said surfaces, whereby the separation of said material due to the heating of said liquid is caused to take place upon said surfaces instead of upon the walls of the vessel in which said heating is effected.

Signed at New York city, in the county of New York and State of New York, this 13th day of July, A. D. 1912.

HENRY L. DOHERTY.

Witnesses:
F. G. SOUTHWORTH,
WILLIAM A. DREGER.